US008738318B2

(12) United States Patent
Spillane (10) Patent No.: US 8,738,318 B2
(45) Date of Patent: May 27, 2014

(54) DYNAMIC ELECTRIC POWER LINE MONITORING SYSTEM (75) Inventor: Philip E. Spillane, Torrance, CA (US)

(73) Assignee: Lindsey Manufacturing Company, Azusa, CA (US)

(*) Notice: Subject to any disclaimer, the term of this patent is extended or adjusted under 35 U.S.C. 154(b) by 137 days.

(21) Appl. No.: 12/848,946

(22) Filed: Aug. 2, 2010

(65) Prior Publication Data

US 2012/0029871 A1 Feb. 2, 2012

(51) Int. Cl.
G01B 5/14 (2006.01)
G01B 21/16 (2006.01)
G06F 15/00 (2006.01)
G06F 17/00 (2006.01)
G01B 13/12 (2006.01)
G01B 17/00 (2006.01)
G01K 1/02 (2006.01)
G01S 7/00 (2006.01)
G01S 15/08 (2006.01)

(52) U.S. Cl.
CPC .............. *G06F 17/00* (2013.01); *G01B 13/12* (2013.01); *G01B 17/00* (2013.01); *G01K 1/024* (2013.01); *G01S 7/003* (2013.01); *G01S 15/08* (2013.01)
USPC ....... 702/158; 340/870.07; 702/122; 702/188

(58) Field of Classification Search
CPC ......... G01S 7/003; G01S 15/08; G01S 17/08; H02G 1/02; H02G 7/00; G01B 13/12; G01B 17/00; G06F 17/00; G01H 1/00; G08B 25/06; H04M 11/04; G01K 1/024

USPC .......... 702/65, 149, 150, 158, 159, 166, 170, 702/171, 62, 122, 188; 73/862.391; 324/522; 340/870.01, 870.07, 870.17, 340/870.27; 367/119; 374/208; 700/58, 292
See application file for complete search history.

(56) References Cited

U.S. PATENT DOCUMENTS 4,420,752 A * 12/1983 Davis et al. .............. 340/870.17
4,589,081 A    5/1986 Massa et al.
(Continued)

FOREIGN PATENT DOCUMENTS

JP        2007178240 A  *  7/2007
WO     2004/038891 A2      5/2004
WO  WO 2007/031435 A1     3/2007

OTHER PUBLICATIONS

International Search Report and Written Opinion dated Dec. 9, 2011 for International Application No. PCT/US2011/046334 (16 sheets).

(Continued)

*Primary Examiner* — John H Le
(74) *Attorney, Agent, or Firm* — Christie, Parker & Hale, LLP (57) ABSTRACT A device and method of precise distance measurement of a transmission line to any object below it is disclosed, along with a network of such devices. The technique employs ultrasonic sensor technology to measure the distance to the nearest object, be it vegetation or a crossing conductor below, and reports that distance wirelessly to the system operator or transmission asset owner. The ultrasonic measurement package may be part of a Transmission Line Security Monitor, which mounts to a transmission line conductor and is powered by the transmission line, transmitting the data by radio links. The technology is equally applicable to encroachment of objects from the side (for example, other transmission lines), as well as to other electrical lines, such as distribution lines, or to other sensing. A built-in transceiver allows the device to communicate with other devices and forward alerts from these devices in a daisy-chain fashion to the intended recipient.

20 Claims, 5 Drawing Sheets (56) References Cited

U.S. PATENT DOCUMENTS

| | | |
|---|---|---|
| 4,709,339 A | 11/1987 | Fernandes |
| 4,714,893 A | 12/1987 | Smith-Vaniz et al. |
| 4,758,962 A | 7/1988 | Fernandes |
| 4,799,005 A | 1/1989 | Fernandes |
| 4,801,937 A | 1/1989 | Fernandes |
| 4,818,990 A | 4/1989 | Fernandes |
| 4,829,298 A * | 5/1989 | Fernandes ............... 340/870.27 |
| 4,843,372 A | 6/1989 | Savino |
| 4,886,980 A | 12/1989 | Fernandes et al. |
| 4,904,996 A | 2/1990 | Fernandes |
| 4,961,644 A | 10/1990 | Marsden |
| 5,029,101 A | 7/1991 | Fernandes |
| 5,132,968 A | 7/1992 | Cephus |
| 5,140,257 A | 8/1992 | Davis |
| 5,341,088 A | 8/1994 | Davis |
| 5,351,032 A | 9/1994 | Latorre et al. |
| 5,372,207 A | 12/1994 | Naville et al. |
| 5,550,476 A * | 8/1996 | Lau et al. ...................... 324/522 |
| 5,818,821 A | 10/1998 | Schurig |
| 5,892,430 A | 4/1999 | Wiesman et al. |
| 5,898,558 A | 4/1999 | Ostendorp |
| 6,048,095 A | 4/2000 | Shindo et al. |
| 6,167,525 A | 12/2000 | Donazzi et al. |
| 6,205,867 B1 * | 3/2001 | Hayes et al. ............. 73/862.391 |
| 6,333,975 B1 | 12/2001 | Brunn et al. |
| 6,523,424 B1 | 2/2003 | Hayes et al. |
| 6,677,743 B1 | 1/2004 | Coolidge et al. |
| 6,794,991 B2 | 9/2004 | Dungan |
| 6,845,333 B2 | 1/2005 | Anderson et al. |
| 6,965,302 B2 | 11/2005 | Mollenkopf et al. |
| 6,965,303 B2 | 11/2005 | Mollenkopf |
| 6,965,320 B1 | 11/2005 | Casey et al. |
| 7,053,770 B2 | 5/2006 | Ratiu et al. |
| 7,202,797 B2 | 4/2007 | Zhavi |
| 7,282,944 B2 | 10/2007 | Gunn et al. |
| 7,304,976 B2 | 12/2007 | Mao et al. |
| 7,369,045 B2 | 5/2008 | Hansen |
| 7,557,563 B2 | 7/2009 | Gunn et al. |
| 7,626,508 B2 | 12/2009 | Kosuge et al. |
| 7,701,325 B2 | 4/2010 | White, II |
| 7,714,735 B2 | 5/2010 | Rockwell |
| 7,733,094 B2 | 6/2010 | Bright et al. |
| 7,764,169 B2 | 7/2010 | Rowell et al. |
| 7,786,894 B2 | 8/2010 | Polk et al. |
| 2002/0019725 A1 | 2/2002 | Petite |
| 2003/0162539 A1 | 8/2003 | Fiut et al. |
| 2004/0054921 A1 | 3/2004 | Land, III |
| 2004/0071185 A1 | 4/2004 | Syracuse et al. |
| 2005/0231387 A1 | 10/2005 | Markelz |
| 2006/0077918 A1 | 4/2006 | Mao et al. |
| 2006/0187017 A1 | 8/2006 | Kulesz et al. |
| 2007/0002771 A1 | 1/2007 | Berkman et al. |
| 2007/0116403 A1 | 5/2007 | Blemel |
| 2007/0152808 A1 | 7/2007 | LaCasse |
| 2008/0024321 A1 | 1/2008 | Polk et al. |
| 2008/0208532 A1 | 8/2008 | Blemel |
| 2008/0228294 A1 | 9/2008 | Nielsen et al. |
| 2008/0297162 A1 | 12/2008 | Bright et al. |
| 2009/0167522 A1 | 7/2009 | Coty et al. |
| 2009/0187285 A1 | 7/2009 | Yaney et al. |
| 2009/0268553 A1 | 10/2009 | Ecker et al. |
| 2010/0033345 A1 | 2/2010 | Polk et al. |

OTHER PUBLICATIONS

Advisory Action for Ex Parte Reexamination for U.S. Appl. No. 90/012,655, mailed Oct. 23, 2013, 17 pages.

Final Office Action for Ex Pane Reexamination for U.S. Appl. No. 90/012,655, mailed Aug. 6, 2013, 92 pages.

Final Office Action for U.S, Appl. No. 12/572, 141, mailed Jul. 3, 2013, 25 pages.

Non-Final Office Action for Ex Parte Reexamination for U.S. Appl. No. 90/012,655, mailed Mar. 14, 2013, 28 pages.

Office Action for U.S. Appl. No. 12/572,141, mailed Jan. 30, 2013, 20 pages.

Order Granting Ex Parte Reexamination for U.S. Appl. No. 90/012,655, mailed Dec. 12, 2012, 22 pages.

Advisory Action for U.S. Appl. No. 12/572,141, mailed Apr. 7, 2011, 3 pages.

Final Office Action for U.S. Appl. No. 12/572,141, mailed Jan. 26, 2011, 10 pages.

Office Action for U.S. Appl. No. 12/572,141, mailed Aug. 23, 2010, 18 pages.

Notice of Allowance for U.S. Appl. No. 11/425,287, mailed Feb. 25, 2010, 7 pages.

Advisory Action for U.S. Appl. No. 11/425,287, mailed Jan. 25, 2010, 3 pages.

Final Office Action for U.S. Appl. No. 11/425,287, mailed Nov. 9, 2009, 10 pages.

Office Action for U.S. Appl. No. 11/425,287, mailed May 22, 2009, 27 pages.

Final Office Action for U.S. Appl. No. 11/425,287, mailed Dec. 10, 2008, 9 pages.

Office Action for U.S. Appl. No. 11/425,287, mailed Jul. 1, 2008, 10 pages.

Ex Parte Reexamination Communication Transmittal form; Notice of Intent to Issue Ex PartePsexeminatIon Certificate and Interview Summary for U.S. Appl. 90/012,655, mailed Dec. 3, 2013, 13 pages.

* cited by examiner

DYNAMIC ELECTRIC POWER LINE MONITORING SYSTEM

BACKGROUND

1. Field

Aspects of the present invention relate to the field of electric power lines. More specifically, aspects of the present invention relate to the field of monitoring from electric power lines.

2. Description of the Related Art

As a transmission line is pushed to carry more energy, the conductor heats and, because of the added heat, the transmission line sags. The traditional method of determining the conductor sag has been derived by a set of operating conditions. For example, knowing the conductor's physical size, its manufacturer's rated current capacity, current flow, the approximate still air ambient temperature, wind speed, and time of day, the system operator could "approximate" how much the conductor sags.

This approximation, however, can provide a false sense of security. For instance, the Northeast Blackout of 2003 was the result of an overloaded transmission line flashing over to ground by sagging into vegetation below the transmission line. The system operator had no knowledge that the transmission line was in danger as it was being operated within the system standard operating conditions.

Therefore, there is a need for precisely and automatically monitoring the location (to determine, for example, the sag) of a power transmission line in relation to nearby objects.

SUMMARY

Embodiments of the invention provide a system and method of monitoring from electric power lines, using one or more sensing devices that are attached to the power lines and equipped with transmitters. For example, in some embodiments, a system and method of very precise distance measurement of an electrical power line to any object around it (for instance, below it) is provided. In an exemplary embodiment, ultrasonic sensor technology is used in the device attached to the power line to measure the distance to the nearest object (such as vegetation, a crossing conductor below, etc.) The device then uses the transmitter to transmit that distance and, optionally, the GPS location wirelessly to the system operator or transmission asset owner in real time.

According to some embodiments, the ultrasonic measurement package is part of a Dynamic Transmission Line Security Monitor, which mounts to a transmission line conductor and is powered by the transmission line. See, for example, Polk et al., U.S. Patent Application Pub. No. 2008/0024321, the content of which is herein incorporated by reference in its entirety. Numerous such monitors, each with their own transmitter, may be attached to the transmission line at appropriate locations.

Furthermore, in other embodiments, the monitors may be equipped with transceivers (or receivers in addition to the transmitters) and located sufficiently close to each other that each monitor is within the transmission range of other monitors, so as to form a network or "mesh" (for example, a daisy chain) of transceivers. Each such monitor in the mesh can communicate with any other monitor in the mesh, possibly using other (intermediate) monitors in the mesh to receive and retransmit the communication (for example, along the daisy chain).

Better management of transmission line sag promotes more efficient use of existing electrical distribution networks, thus forestalling the building of new networks.

In an exemplary embodiment of the present invention, a device for attaching to an electrical power line is disclosed. The device includes a distance sensor, a wireless transmitter, a processor, and a power supply. The distance sensor is configured to measure the distance of an object to the device. The processor is adapted to interpret the measured distance from the distance sensor, and transmit a message related to the interpreted distance through the transmitter. The power supply is configured to supply power to the distance sensor, the transmitter, and the processor.

The distance sensor may include an ultrasonic distance sensor.

The power line may include a transmission line.

The transmission line may include a high voltage line.

The high voltage line may be configured to operate between 110 kV and 765 kV.

The power supply may include an inductive power supply configured to generate power inductively from the power line.

The distance sensor may be configured to sense down and measure the distance to the object that is beneath the power line.

The distance sensor may be configured to sense sideways and measure the distance to the object that is beside the power line.

The device may further include a global navigation satellite system sensor to identify a location of the device. The processor may be further adapted to transmit the location in the message.

The device may further include a wireless receiver configured to receive another such message from another such device. The processor may be further adapted to receive the other message from the other device through the receiver, and retransmit the other message through the transmitter.

In another exemplary embodiment of the present invention, a method of automated measuring and alerting of an object in the proximity of an electrical power line using a distance sensor is provided. The distance sensor is configured in a device attached to the power line. The device includes a wireless transmitter and a processor. The method includes: measuring the distance of the object to the device using the distance sensor, interpreting the measured distance using the processor, and transmitting a message based on the interpreted distance using the transmitter.

The power line may include a transmission line.

The distance sensor may include an ultrasonic distance sensor.

The device may further include a wireless receiver configured to receive another such message from another such device. The method may further include: receiving the other message from the other device through the receiver, and retransmitting the other message through the transmitter.

The device may be further configured to generate power inductively from the power line.

According to yet another embodiment of the present invention, a network of devices for attaching to an electrical power line and communicating with an intended recipient is provided. Each device of the network of devices includes a distance sensor, a wireless transceiver, an inductive power generator, and a processor. The distance sensor is configured to measure the distance of an object to the device. The inductive power generator is configured to generate electrical power inductively from the power line for use by the device. The processor is adapted to interpret the measured distance from the distance sensor, transmit a message related to the interpreted distance through the transceiver, receive another such message through the transceiver from another device in the network of devices, and retransmit the other message from the other device through the transceiver. The network of devices is configured to wirelessly communicate the message from the device to the intended recipient.

The power line may include a transmission line.

The network may be further configured to wirelessly communicate the message from the device to the intended recipient even in the event that another of the devices in the network is unable to retransmit messages.

The distance sensor may be configured to sense down and measure the distance to the object that is beneath the power line.

Each device of the network of devices may further include a global navigation satellite system sensor to identify a location of the device. The processor may be further adapted to transmit the location in the message.

BRIEF DESCRIPTION OF THE DRAWINGS

The accompanying drawings illustrate embodiments of the present invention, and together with the description, serve to explain the principles of the embodiments of the present invention.

DETAILED DESCRIPTION

The illustrative embodiments that follow are only exemplary applications of the present invention and not intended to limit the scope of the invention. For example, while the embodiments may be directed to electrical transmission lines, there is nothing to prevent other embodiments from being directed to electrical distribution lines, or to any type of electrical power line. Further, while embodiments may be directed at detecting the sag (for example, the distance to the nearest object below an electrical line), there is nothing to prevent other embodiments from being directed to detecting the proximity of an object (for example, a neighboring transmission line) located to the side of the transmission line, or anywhere else in relation to the transmission line. Still other embodiments may be directed to other electric power line monitoring (for example, temperature, motion, etc.) or monitoring from the electric power line, using a network (mesh) of transceiver-equipped monitors to maintain communication between each of the monitors and an intended recipient (such as the power line owner).

Exemplary embodiments are directed to a device and technique of very precise distance measurement and reporting of a transmission line to any object below it, such as growing vegetation, a crossing conductor, etc. Each such device is equipped with a transmitter to allow wireless communication with an intended recipient. Using off-the-shelf ultrasonic sensor technology, for instance, to measure the distance to the nearest object, example devices transmit that distance and other relevant information—for example, optionally reporting the Global Positioning System (GPS) location—wirelessly to the system operator or transmission asset owner. The data can be analyzed, for instance, to determine if corrective action (e.g., changing power load, dispatching work crews) needs to take place. In some embodiments, the ultrasonic measurement package is part of a Dynamic Transmission Line Security Monitor, which mounts to a transmission line conductor and is powered by the transmission line, transmitting the data by radio links. See the above Polk et al. reference.

Numerous such monitors, each with their own transceiver (or a transmitter and a corresponding receiver), may be attached to the transmission line. The monitors are sufficiently close that each monitor is within the transmission range of other monitors, to form a "mesh" (for example, a daisy chain) of transceivers. Each such monitor in the mesh can then communicate with any other monitor in the mesh, possibly using other (intermediate) monitors in the mesh to receive and retransmit the communication (for example, along the daisy chain).

Figure 1:
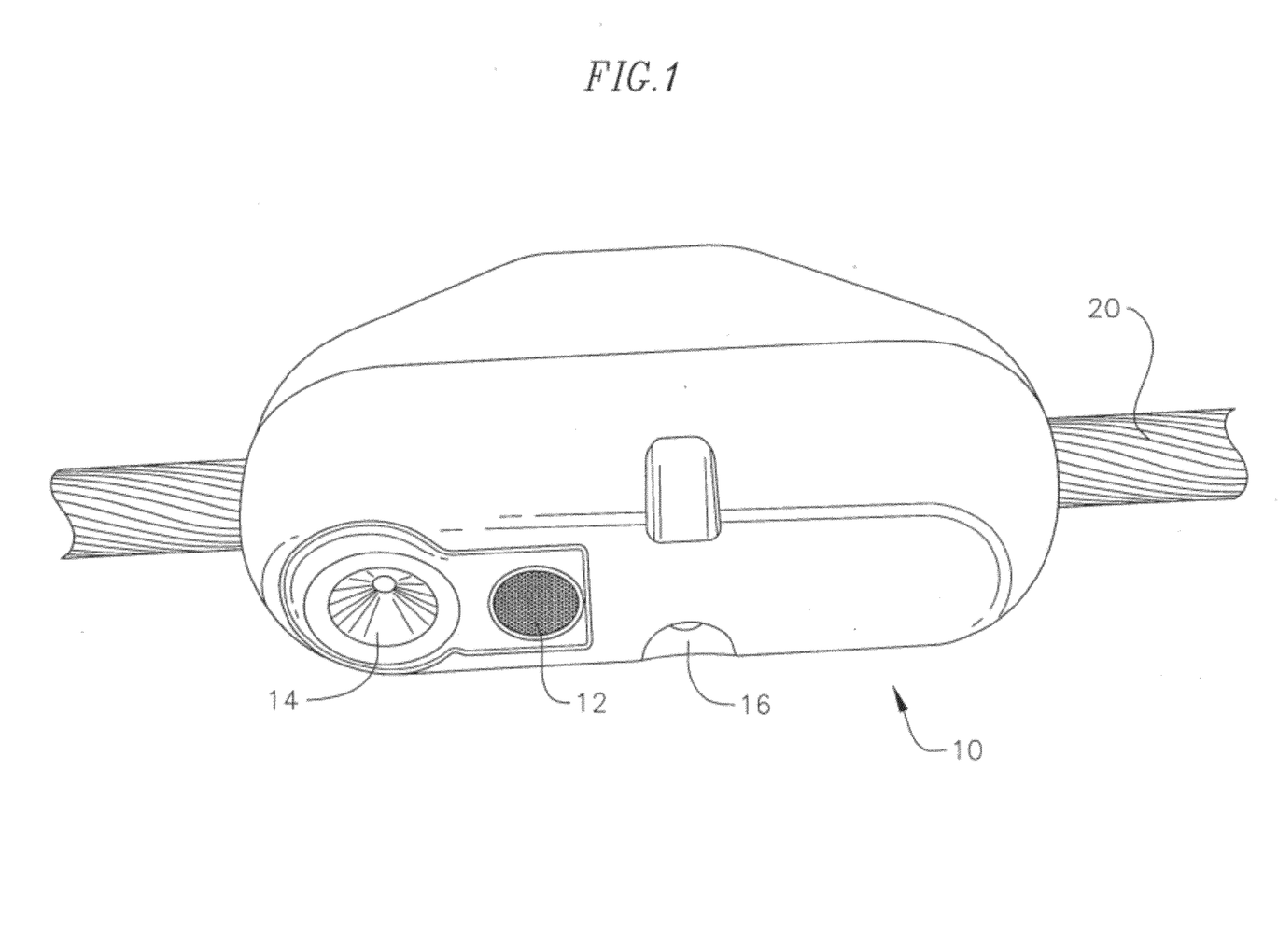
FIG. 1 is an illustration of an exemplary transmission line device with distance sensor, according to an embodiment of the present invention.

FIG. 1 is an illustration of an exemplary transmission line device with distance sensor, according to an embodiment of the present invention.

Referring to FIG. 1, the device 10 has two halves, a top half and a bottom half, and attaches to a transmission line 20 by clasping the two halves around the transmission line 20 and securing them. For example, a bolt can be inserted through recess 16 to secure the two halves. The device 10 is shown with two external sensors, an ultrasonic distance sensor 12 to measure the distance between the device 10 and any object below it, and an infra-red (IR) motion sensor 14 to detect motion of a heat source below the device 10. Other sensors—for example, a temperature sensor to measure the temperature of the conductor (transmission line), an accelerometer to measure pitch and roll of the device 10, etc.—may be added, or may be internal to the device 10. The sensors do not necessarily have to be sensing the power line or its immediate surroundings. They could, for example, sense weather-related phenomena, such as cloud cover.

Internal to the device 10 in FIG. 1 are a transmitter or transceiver, an optional global navigation satellite system (GNSS) sensor, a processor, and a power source. The transceiver is for sending and receiving messages (such as alerts) with, for example, other such devices. The optional GNSS sensor—for example, a Global Positioning System (GPS) sensor—is for detecting the location of the device 10. The processor is for interpreting the sensor readings, sending alerts to suitable receivers using the transmitter portion of the transceiver, and relaying alerts from the processors of other devices. The power source is for supplying power to the components of the device 10, such as the sensors, the transceiver, and the processor. The power source may be, for example, an inductive power generator (that generates power inductively from the transmission line 20). The power source may also be a stored power supply (for example, a stored power supply that is charged from the inductive power generator). The inductive power supply, for example, could be configured to generate power based on the current of the electrical lines to which it is attached.

Figure 2:
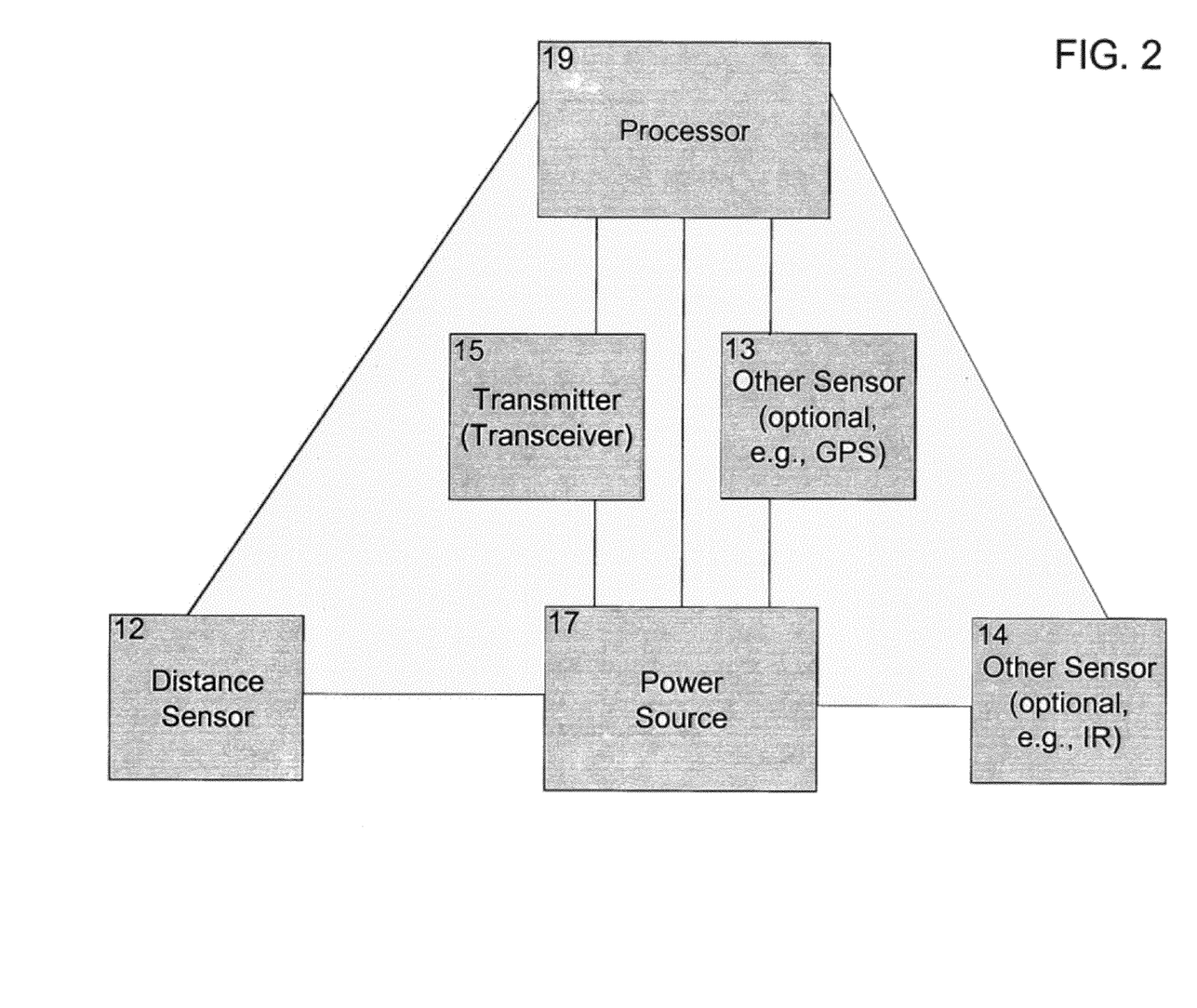
FIG. 2 is a block diagram of the components and their connections of an exemplary transmission line device with distance sensor, according to an embodiment of the present invention.

FIG. 2 is a block diagram of the components and their connections in an exemplary transmission line device with distance sensor (see, for example, FIG. 1), according to an embodiment of the present invention. As described above, the components include a distance sensor 12, a transmitter (or transceiver) 15, a processor 19, a power source 17, an optional GPS (or other, for example temperature) sensor 13, and an optional IR motion (or other) sensor 14. The power source 17 supplies power to each of the other components. The processor 19 is also connected to each of the other components, to coordinate their readings, transmissions, etc.

In further detail, the embodiment in FIG. 1 depicts a fixed ultrasonic distance sensor 12, directed downward, with a 30° cone of surveillance, though the invention is not so limited. Such a sensor 12 may be configured, for example, to sense any object within 40 feet of the device, while the processor 19 may be set up to alert an operator of any object within 30 feet by broadcasting an alert through the transmitter or transceiver 15.

When the operator is outside of the transmission range of the transceiver of the device, other such devices that are within the transmission range may receive the alert with their transceivers and retransmit it. For example, a network (or mesh) of suitably spaced (for example, one-quarter mile apart) devices can transmit an alert in daisy-chain fashion along the length of a transmission line to an operator or other suitable recipient of the alert (e.g., a more powerful transmitter, or a communication line).

Figure 3:
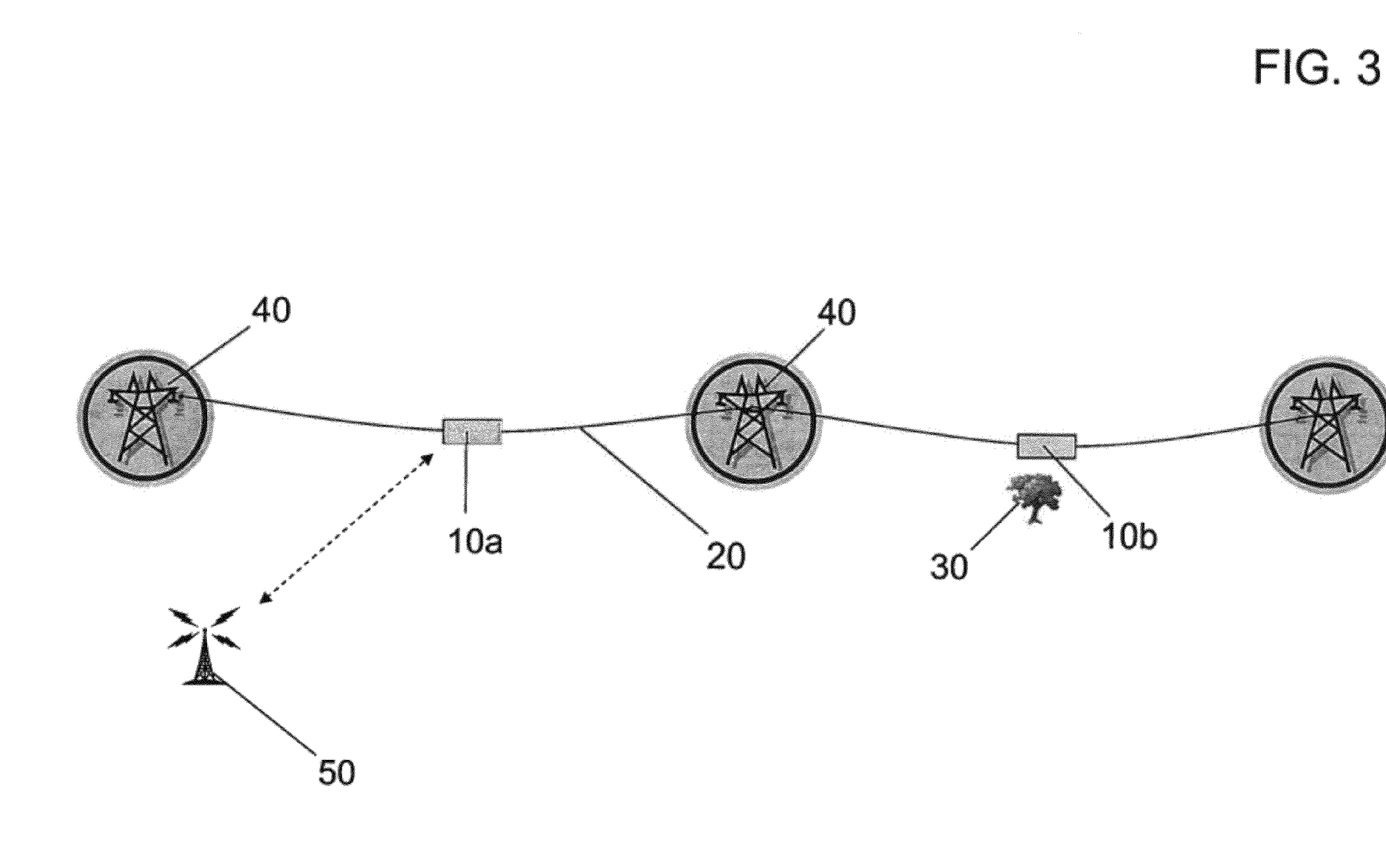
FIG. 3 is an illustration of an exemplary network of transmission line devices, according to an embodiment of the present invention.
Figure 4:
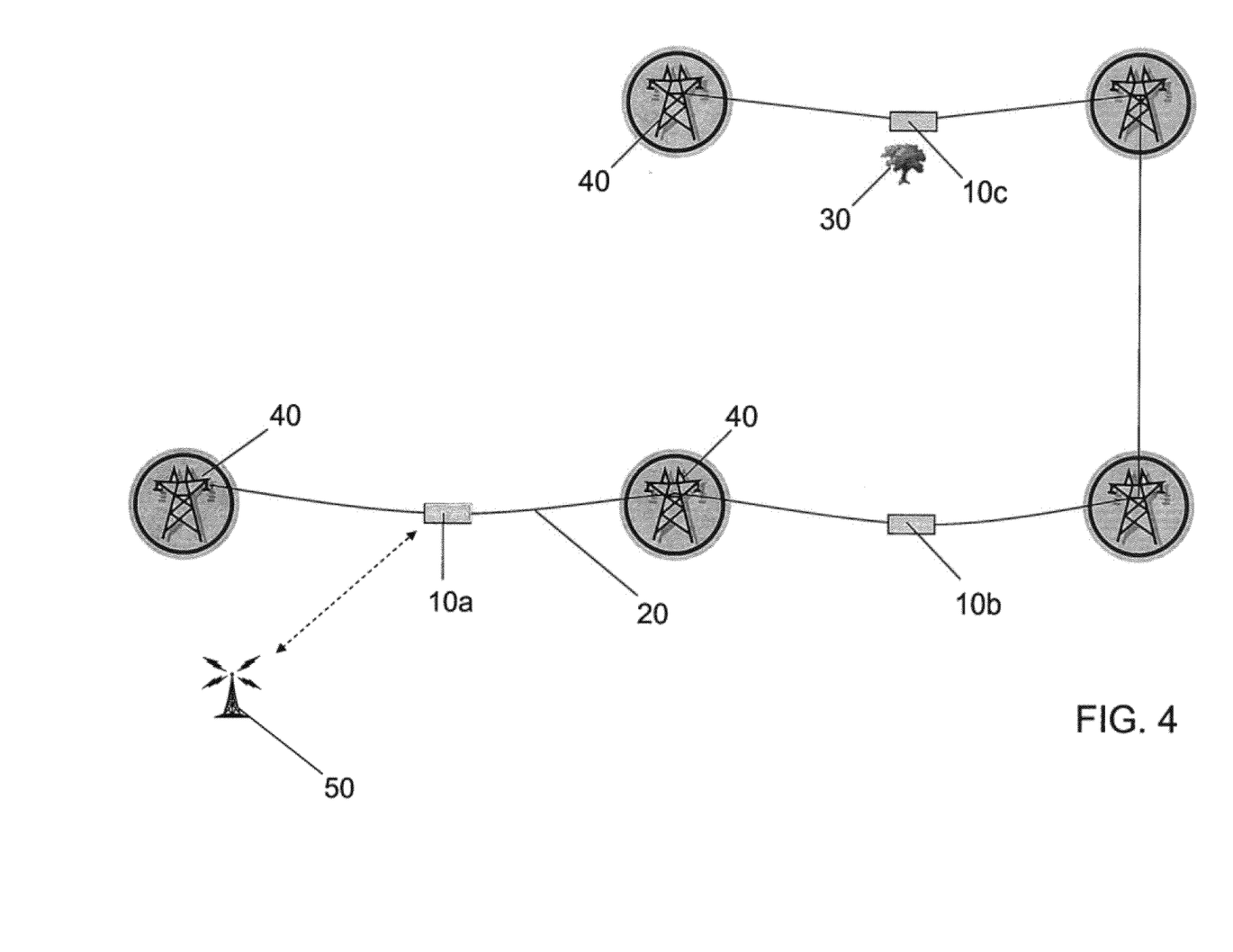
FIG. 4 is an illustration of another exemplary network of transmission line devices, according to an embodiment of the present invention.

FIGS. 3 and 4 illustrate exemplary networks of transmission line devices, according to an embodiment of the present invention.

Referring to FIG. 3, for simplicity of illustration, two devices 10a and 10b are shown, on transmission line 20. Each device is located mid-span, that is, halfway between the transmission line towers 40, where the transmission line 20 is likely to be at its lowest point. For example, the transmission line towers 40 may be about one-quarter mile apart, which means devices 10a and 10b are also about one-quarter mile apart. The devices may also be spaced more frequently or less frequently, depending on such as factors as completeness of coverage, transmission range of the devices, etc.

In the example of FIG. 3, an operator station 50 may be within transmission range of device 10a but not of device 10b (if, for instance, the transmission ranges of the devices is between one-quarter and one-half mile). An object 30 (in this case, a tree) encroaching on the power line can be sensed with device 10b, which can alert the operator station 50 by transmitting the alert, which is then received by device 10a and retransmitted to the operator station 50.

FIG. 4 is similar to FIG. 3, only the transmission line 20 is shown extended to two more transmission line towers 40, with a third device 10c added as well. It should be noted that device 10c is further from operator station 50 than either device 10a or device 10b.

Referring to FIG. 4, the operator station 50 may be within the transmission range of both devices 10a and 10b, but not of device 10c. Both devices 10a and 10b, however, may be in transmission range of device 10c. Thus, device 10c could relay a message to operator station 50 by transmitting a message to one or both of devices 10a and 10b, with one or both of devices 10a and 10b receiving and retransmitting the message to operator station 50. It should be noted that in this case, device 10c can relay a message to operator station 50, even if one of devices 10a or 10b was "offline" (that is, not capable of retransmitting messages from other devices). Thus, the network has a certain amount of redundancy or fault tolerance built into it.

Other locations for the devices are also possible. For example, they may be positioned near other aboveground obstructions, such as structures or growing vegetation. In addition, the transmission range of the devices may be considerably farther, which allows room for more redundancy in cases such as transmitter failure, or for variance in transmission ranges (of the transmitters) among the devices or variance in the distance between devices, without compromising the network.

Care should be taken to control and coordinate the message relaying. For example, each message (alert) from a monitor can be identified and time-stamped from that monitor. That way, when another monitor in the network receives the message, that receiving monitor can detect if it has received (and retransmitted) that message already and, if not, retransmit the message for other monitors in the network to receive. This promotes distribution of the message throughout the network and without unnecessary retransmissions of the message. Still other protocols (for example, notifying the sender or other interested devices of the receipt of a message by an intended recipient) can be built into the communications to make them more robust and ensure that the messages reach their intended recipients and without using excessive communication resources.

Figure 5:
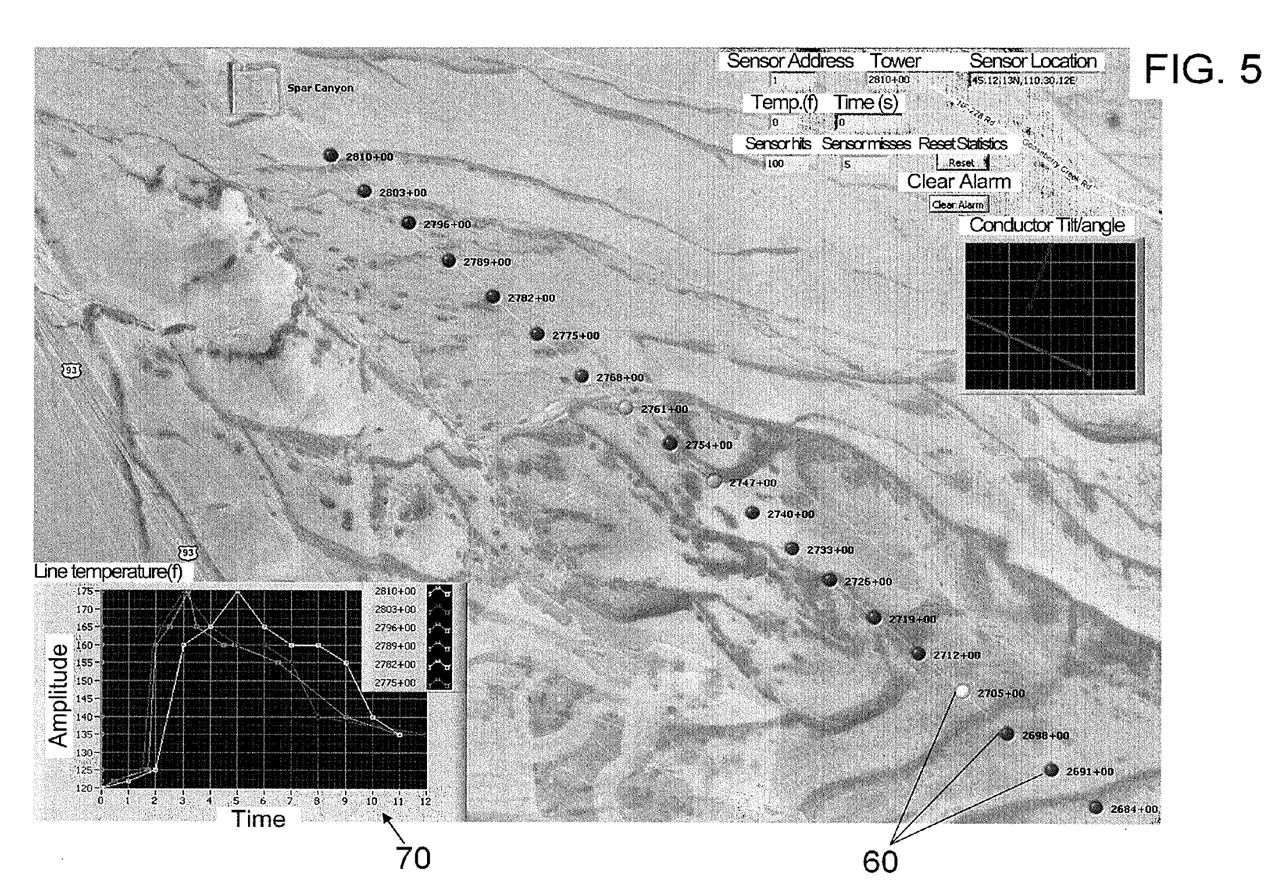
FIG. 5 is a screen shot of a graphical depiction of the status of the transmission line devices is an exemplary network of such devices, according to an embodiment of the present invention.

FIG. 5 is a screen shot of a graphical depiction of the status of the transmission line devices is an exemplary network of such devices, according to an embodiment of the present invention.

Referring to FIG. 5, the devices are shown on a topographic map as status circles 60 corresponding to their locations and status. The statuses can be represented, for example, as different sizes, shapes, shades, or colors (e.g., green="OK," yellow="may need to investigate," red="a problem"). There can be different displays for different sensors (such as distance to objects below, temperature of the conductor, etc.) For instance, a display for distance below the transmission line to the closest object may use three different color circles: green for greater than 40 feet (i.e., out of sensor range), yellow for between 30 and 40 feet (i.e., in sensor range, but not an immediate concern), and red for less than 30 feet (i.e., in sensor range and a concern).

Also shown in FIG. 5 is a graphical depiction 70 over time of the status of one or more devices, in this case the conductor temperature of six devices. One axis (for instance, the horizontal axis) can represent time, another axis (e.g., the vertical axis) can represent a sensor measurement (for example, distance to closest object below the transmission line), with lines connecting the measurements of one device over time and different lines representing different devices.

The same technology described above can also be used to measure the distance of any object next to the transmission line. For instance, in some embodiments, the distance to a neighboring transmission line can be monitored. This could, for example, alert operators when transmission lines are getting dangerously close to one another (for instance, in a storm). This may be accomplished by adding a second ultrasonic distance sensor oriented to look sideways instead of down. The alerts for such sideways measurements could be based on shorter distances, such as green for 22 feet or more (i.e., not a concern), yellow for between 18 feet and 22 feet, and red for under 18 feet (a concern).

In one embodiment, the device is configured for extra high voltage transmission lines, that is, designed to carry more than 345 kilovolts (kV) between conductors, preferably between 345 kV and 765 kV. In other embodiments, the device is configured for high voltage transmission lines, that is, designed to carry more than 110 kV. In still other embodiments, the device is configured for any power line.

The foregoing description has provided by way of exemplary and non-limiting examples a full and informative description of the exemplary embodiments of this invention. However, various modifications and adaptations may become apparent to those skilled in the relevant art in view of the foregoing description, when read in conjunction with the accompanying drawings and the appended claims. Nonetheless, all such and similar modifications of the teachings of this invention will still fall within the scope of this invention. Furthermore, some of the features of the embodiments of this invention could be used to advantage without the corresponding use of other features. As such, the foregoing description should be considered as merely illustrative of the principles of the invention, and not in limitation thereof.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A device configured to securely attach to an electrical power line at a fixed location on the power line and measure a distance from the power line to an object encroaching on the power line, the device comprising:
   a distance sensor configured to measure the distance of the encroaching object to the power line from the fixed location;
   a wireless transmitter;
   a processor adapted to:
      interpret the measured distance of the encroaching object to the power line; and
      transmit an alert related to the encroachment of the object to the power line through the transmitter; and
   a power supply configured to supply power to the distance sensor, the transmitter, and the processor.

2. The device of claim 1, wherein the distance sensor comprises an ultrasonic distance sensor.

3. The device of claim 1, wherein the power line comprises a transmission line.

4. The device of claim 3, wherein the transmission line comprises a high voltage line.

5. The device of claim 4, wherein the high voltage line is configured to operate between 110 kV and 765 kV.

6. The device of claim 1, wherein the power supply comprises an inductive power supply configured to generate power inductively from the power line.

7. The device of claim 1, wherein the distance sensor is configured to sense down and measure the distance to the encroaching object that is beneath the power line.

8. The device of claim 1, wherein the distance sensor is configured to sense sideways and measure the distance to the encroaching object that is beside the power line.

9. The device of claim 1, further comprising a global navigation satellite system sensor to identify the fixed location of the device on the power line, wherein the processor is further adapted to transmit the location in the alert.

10. The device of claim 1, further comprising a wireless receiver configured to receive another such alert from another such device, wherein the processor is further adapted to:
   receive the other alert from the other device through the receiver; and
   retransmit the other alert through the transmitter.

11. A method of automated measuring and alerting of a distance from an electrical power line to an object encroaching on the power line using a distance sensor configured in a device securely attached to the power line at a fixed location on the power line and comprising a wireless transmitter and a processor, the method comprising:
   measuring the distance of the encroaching object to the power line using the distance sensor from the fixed location;
   interpreting the measured distance of the encroaching object to the power line using the processor at the fixed location; and
   transmitting an alert based on the encroachment of the object to the power line using the transmitter from the fixed location.

12. The method of claim 11, wherein the power line comprises a transmission line.

13. The method of claim 11, wherein the distance sensor comprises an ultrasonic distance sensor.

14. The method of claim 11, wherein the device further comprises a wireless receiver configured to receive another such alert from another such device, and wherein the method further comprises:
   receiving the other alert from the other device through the receiver at the fixed location; and
   retransmitting the other alert through the transmitter from the fixed location.

15. The method of claim 11, wherein the device is further configured to generate power inductively from the power line at the fixed location.

16. A network of devices configured to securely attach to an electrical power line at corresponding fixed locations on the power line and measure a distance from the power line to objects encroaching on the power line, and for communicating with an intended recipient, each device of the network of devices comprising:
   a distance sensor configured to measure the distance from the power line to an encroaching object of the objects encroaching on the power line from a respective fixed location of the fixed locations;
   a wireless transceiver;
   an inductive power generator configured to generate electrical power inductively from the power line at the fixed location for use by the device; and
   a processor adapted to:
      interpret the measured distance of the power line to the encroaching object;
      transmit an alert related to the encroachment of the object to the power line through the transceiver;
      receive another such alert through the transceiver from another device in the network of devices; and
      retransmit the other alert from the other device through the transceiver, wherein the network of devices is configured to wirelessly communicate the alert from the device to the intended recipient.

17. The network of claim 16, wherein the power line comprises a transmission line.

18. The network of claim 16, wherein the network is further configured to wirelessly communicate the alert from the device to the intended recipient even in an event that another of the devices in the network is unable to retransmit alerts.

19. The network of claim 16, wherein the distance sensor is configured to sense down and measure the distance to the encroaching object that is beneath the power line.

20. The network of claim 16, wherein each device of the network of devices further comprises a global navigation satellite system sensor to identify the fixed location of the device on the power line, and wherein the processor is further adapted to transmit the location in the alert.

* * * * *